United States Patent [19]  [11] 3,890,227
Merchant, Jr.  [45] June 17, 1975

[54] TREATMENT OF PROCESS WATER

[75] Inventor: Philip Merchant, Jr., Houston, Tex.

[73] Assignee: Petro-Tex Chemical Corporation, Houston, Tex.

[22] Filed: Aug. 29, 1973

[21] Appl. No.: 392,718

Related U.S. Application Data

[62] Division of Ser. No. 182,866, Sept. 22, 1971, Pat. No. 3,775,312.

[52] U.S. Cl. ................ 210/51; 210/54; 260/501.2
[51] Int. Cl. .............................................. C02b 1/20
[58] Field of Search ............ 210/51, 54; 260/278 B, 260/501.2, 821, 822

[56] References Cited
UNITED STATES PATENTS

| | | | |
|---|---|---|---|
| 1,797,192 | 3/1931 | Gracia | 260/821 |
| 2,270,681 | 1/1942 | DeGroote | 260/501.2 X |
| 2,347,567 | 4/1944 | Ogilby | 210/54 X |
| 2,446,115 | 7/1948 | Svendsen | 260/822 |
| 2,505,226 | 4/1950 | Barrows | 260/278 B |
| 2,604,467 | 7/1952 | Crouch et al. | 260/822 |
| 3,372,129 | 3/1968 | Phillips | 210/54 X |
| 3,483,174 | 12/1969 | Libengood et al. | 260/821 X |

Primary Examiner—Thomas G. Wyse
Attorney, Agent, or Firm—N. Elton Dry; Kenneth H. Johnson

[57] ABSTRACT

Separation of emulsifiers which are salts of the condensation product of naphthalene sulfonic acid and formaldehyde from process water by contacting the process water with an amine having a molecular weight of at least 60. The process water and/or the amine is reduced to a pH of 7.0 or less prior to contacting. For example, polychloroprene is produced by emulsion polymerization using said salts as surfactants with the salts being washed out into process water. The process water is reduced to pH of 4.0 with HCl and then is contacted with polyethyleneamine.

16 Claims, No Drawings

TREATMENT OF PROCESS WATER

This is a division of application Ser. No. 182,866, filed Sept. 22, 1971, now U.S. Pat. No. 3,775,312.

Neoprene, or polychloroprene, is conventionally polymerized in emulsion polymerization utilizing a combination of emulsifying agents. Conventionally, emulsifying agents are such as rosin acid salts and various secondary emulsifiers. Some of the emulsifying agents may remain in the polymer but certain water soluble emulsifiers are substantially removed before final isolation and processing of the polymer. These emulsifiers that are removed are sometimes referred to as secondary emulsifiers. For example, the polymer may be recovered by coagulation of the latices and thereafter the water soluble emulsifiers removed before final milling. The water soluble emulsifiers are removed for example, by washing the polymer with warm water on a wash belt. This washing may be assisted by extraction by use of solvents. Normally, the washing requires the use of large volumes of water and if the emulsifying agents are biodegradable this water may be processed by biooxidative degradation; however if the wash water contains non-biodegradable emulsifying agents this presents a major problem because of the restrictions on the releasing of significant amounts of organic compounds into streams and rivers. It is an object of this invention to remove certain non-biodegradable emulsifiers from noeprene process water or other water containing these emulsifiers. An additional problem is the presence of the rosin acids and other compounds particularly because these rosin compounds cause the floatation of the bacteria used for biodegradation of these waste waters. When the bacteria float they are not as effective in degrading the feed and further the bacteria may float into the effluent from the biodegradation pond and thus contaminate the water into which the effluent is discharged. Therefore, it is another object to remove the rosin compounds from the process water.

In the polymerization of chloroprene it has been the practice to frequently include as one of the emulsifiers a salt of the condensate product of naphthalene sulfonic acids and formaldehyde such as disclosed in U.S. Pat. Nos. 2,046,757 and 2,264,173. Examples of emulsifiers of this type are sold under the trade names of Lomar PW produced by Nopco and Daxad-15 produced by W. R. Grace. This type of emulsifier is employed to increase the stability of latices especially when the emulsion contains high concentration of electrolytes or in instances in which the other emulsifying agents are poor dispersing agents for the solid polymer. The formaldehyde-naphthalene sulfonic acid condensation product salts are excellent emulsifiers and, accordingly, have been incorporated in commercial recipes. However, these emulsifiers are washed out of the polymer and are for practical purposes relatively non-biodegradable because the aromatic portion of the salt renders it immune or very resistant to bacteriological decay. Thus, it was a principal object of this invention to provide a method for separating this particular type of emulsifier from neoprene process water after polymerization. For convenience, in this application these surfactants are sometimes referred to as "condensation product salts" but it is understood that this refers to the salts of the condensation product of naphthalene sulfonic acid and formaldehyde.

The separation of the emulsifiers from process water presents significant problems. In the first place the emulsifiers are present in a very small percentage based on the volume of water and thus any method for separation must be highly efficient. Further, the process water usually contains other materials such as neoprene latex and other emulsifiers or additives and the method of separation must operate efficiently in the presence of the other materials. Also, in instances where rosin compounds are present additional problems are encountered as noted.

According to this invention it has been discovered that the salts of the condensation products of naphthalene and formaldehyde present in process water can be efficiently and effectively separated from the aqueous composition by contacting the process water containing the salt as a first component with a second component which is an amine with the contacting having been made after at least one of the components has been reduced in pH to a pH of less than 7.0. In the copending application Ser. No. 182,908 filed by Robert D. Pruessner on even date herewith and entitled Treatment of Process Water, it is disclosed that the condensation product salts can be separated by contacting the water containing the salt with certain amines and thereafter lowering the pH of the mixture to a pH of 7.0 or less. The process of this invention is an improvement, for example, over the examples in that application in that better separation of the condensation product salts is achieved. According to this invention, better separation is achieved as evidenced by faster settling rates, a different type of precipitate, and a more easily filtered or centrifuged precipitate. The exact nature of the difference between the precipitates is not fully understood and applicant does not wish to be limited to any theory of the invention but it is believed that the precipitates of this invention are more dense and probably are made up of larger particle sizes. One measurable difference is that the precipitates of this invention have faster settling rates. The overall effect of acidifying prior to contacting of the condensation product salts with amines is that much easier separations can be achieved. Because of the different nature of the precipitate obtained according to this invention it is possible to filter the solids and thereby achieve economics in operation. For example, it is possible to centrifuge and filter the precipitate to a reasonable concentration of solids such as about 20 percent.

Either the process water containing the condensation product salts or the amine may be acidified prior to contacting of the two components. An alternative method is to acidify the process water and the amine composition prior to contacting of the two components. The preferred method is to reduce the pH of the process water prior to contacting. One disadvantage of acidifying the amine prior to contacting is that the amine compositions produce exothermic reactions when mixed with water or aqueous acid solutions and to avoid this problem it is preferred to add the acid to the process water. The pH of the process water and/or the amine should be less than 7.0 prior to contacting the two components and the pH of the combined components should also be less than 7.0. In other words the amount of acid added prior to mixing should be sufficient to reduce the pH of the mixed composition to less than 7.0. Preferably, the pH of the single components and the mixtures should be no greater than 5.0 and preferably no greater than 4.0. Optimum pH values can be determined for each process water and particular amines but excellent results have been achieved at pH's such as 3.5 and 3.0. Ordinarily, the pH will not be reduced to below about 2.0 or 2.5 because further reduction of the pH does not result in sufficient changes in the precipitation process and at very low pH corrosion problems are increased.

The amine should contain at least one RNH group and preferably at least one NN—R—NH group with R being an aliphatic or aromatic radical having no more than 5 or 6 carbon atoms but the non-aromatic amines are preferred unless organic solvents are included. The amine should have a molecular weight of at least 60 and preferably will contain at least two amine groups. R can be acyclic or cyclic and can be branch chain but straight chain compounds are generally preferred. The preferred compounds are acyclic. The compounds should be basic preferably with a basic ionization constant ($K_b$) of at least $1 \times 10^{-4}$ with the ionization constant being discussed e.g. on page 252-4 of Richter, Textbook of Organic Chemistry (John Wiley 2nd. Edition). Ordinarily, R will be a hydrocarbon radical because negative groups such as halogen atoms detract from the basicity of the amine groups. R can be saturated or unsaturated but saturated radicals are preferred. R can contain from one to 5 or 6 carbon atoms but from 2 to 3 or 4 carbon atoms and mixtures are more preferred with excellent results having been obtained where R has 2 carbon atoms. The amine groups may be primary, secondary, tertiary or combinations thereof. One or more of the nitrogen atoms may form a part of a ring as in heterocyclic compounds. Amine compounds wherein there is at least one secondary amine group are especially preferred such as polyalkylene amines. Examples of amines with at least one secondary amine group are triethylenetetraamine and tetraethylenepentamine and mixtures thereof. The amines should have some solubility in water and preferably will have a solubility at 25°C. of at least 1 gram per liter of water.

Examples of suitable amines are such as compounds of the formula $H2N[—R—N H]_xH$ wherein R is an aliphatic radical of 1 or 2 to 5 carbon atoms and $x$ is from 1 to 10 or 12 or more and preferably is from 2 to 6. Examples of specific compounds are such as ethylenediamine, diethylenetriamine, triethylenetetramine, tetraethylenepentamine, pentaethylenehexamine, dipropylenetriamine and so forth. Less preferred are monoamines but if the amine group is secondary better results are obtained with examples of compounds being such as di-n-propylanine or tri-n-propylamine. The amines may be by product streams from other processes and may contain a mixture of amines. The amines preferably will be biodegradable and preferably will not be significantly toxic to the activated sludge being used for biodegradation.

Polymers of chloroprene, 2-chloro-1,3 butadiene, are polymerized in an aqueous composition in the presence of surfact active agents generally referred to as emulsifiers. The term "polymers of chloroprene" encompasses polymers in which chloroprene is the major or predominant monomer. Comonomers may also be employed such as 2,3-dichloro-1,3-butadiene; acrylontrile, methyl methacrylate and so forth. Usually, the total amount of comonomers will represent no greater than 25 mol percent of the total monomers and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization of chloroprene are disclosed, for example, in Encyclopedia of Polymer Science and Technology, Vol. 3, page 703-730 (Interscience, 1965) and in numerous patents such as U.S. Pat. No. 2,264,173 and U.S. Pat. No. 2,264,191 both issued on Nov. 25, 1941 and these three references are incorporated by reference. The polymerization may be conducted either batch or continuously.

In addition to the salts of the condensation products of naphthalene sulfonic acid and formaldehyde other emulsifiers may also be employed such as the salts of rosins and rosin derivatives such as wood rosin, disproportionated rosin or hydrogenated rosin; ammonium, sodium or potassium salts of long chain fatty acids; sodium octyl sulfate, nonionic surface active agents such as the ethylene oxide or propylene oxide condensation products of compounds containing reactive hydrogen atoms. Additional emulsifying agents are disclosed in U.S. Pat. No. 2,264,173. A preferred emulsifier to be used in conjunction with the salts of the condensation product of naphthalene sulfonic acids with formaldehyde are the rosin derivative emulsifiers. In this specification rosin or rosinates include the various commercial rosins, the hydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731-S).

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha' -azo-bis-isobutyronitrile and the like. Suitable inorganic peroxides are such as inorganic per acids including per sulfates, perborates or percarbonates, e.g. ammonium or potassium per sulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The salts of the condensation product of naphthalene sulfonic acids with formaldehyde with or without other emulsifiers may be added at any stage during polymerization or may be fed during polymerization or may be added to the water during recovery of polymer such as before or after monomer is removed. However, because the salts of the condensation product of naphthalene sulfonic acids with formaldehyde usually add stability during polymerization it is preferred to make the incorporation into the recipe prior to or during polymerization. Although the amount of salts of the condensation product of naphthalene sulfonic acids with formaldehyde is not critical certain proportions are normally used and within the range of from about 0.05 to 2.0 parts by weight of this salt compound per 100 parts of polymerizable monomers are usually employed with a preferred range being from about 0.1 to 1.0 parts per 100 parts of monomer based on the water from 0.01 to 3 or 5 parts per 100 parts of water.

The usual modifiers or other agents may be present in the emulsion. For instance, the polymerization may be carried out in the presence of sulfur to produce a sulfur modified polychloroprene. Also, chain transfer agents may be employed such as the alkyl mercaptans, e.g. dodecyl mercaptan, iodoform, benzyl iodide and dialkyl xanthogen disulfides e.g. diisopropyl xanthogen disulfide. Water soluble iron salts e.g. ferrous sulfate or iron chelates may be suitably employed.

Normally, the polymerization would be conducted in an oxygen free or substantially oxygen free atmosphere such as use of an inert gas. However in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 to 90 percent conversion. The temperature of polymerization may be varied depending upon the particular type of polymer being employed with suitable ranges being from 0° to 90°C. with the preferred range being between 15°C. and 55°C.

The polymerization may be short stopped by the addition of agents such as para-tertiary-butyl catechol and thiodiphenylamine. The process of polymerization may be either continuous or may be conducted in batch.

The naphthalene sulfonic acid condensation salts may be salts of various types such as alkali metal or ammonium salts. Preferred are the sodium, lithium or potassium salts and mixtures thereof with the sodium salts being particularly preferred. A preferred condensation product is the condensation product of an average of about two moles of naphthalene sulfonic acid with one mole of formaldehyde but these ratios can be varied.

After polymerization, the process water containing the condensation product salts may be separated from the chloroprene polymer product by any means and at any stage of the polymerization or recovery of polymer. A conventional method is to coagulate the latices and thereafter remove the water soluble emulsifiers by washing the polymer on a wash belt. These techniques are well known to those skilled in the art of manufacture of neoprene. The process water normally will contain material such as latices, modifiers such as mercaptans, sulfur, short stop agent and rosin base surfactants. This process water may be pretreated to remove any of these compositions or may be treated to concentrate the water such as by settling. However, normally a dilute solution of process water is obtained which contains a minor amount of condensation product salts such as less than 3 percent by weight of the total aqueous composition. Because the condensation product salts are usually washed out with considerable wash water the concentration of the condensation product salts will generally be less than 2 weight percent or less than one percent based on the total aqueous composition.

The process water containing the condensation product salts may be contacted with the amine by any suitable means to insure intimate contact. Means for intimately contacting liquids are well known and include such devices as agitators, mixers, pumps, centrifuges, reaction in columns or in filtration equipment and so forth. It has been discovered that it is undesirable to severely agitate the amine process water mixture and that superior results may be obtained under less than turbulent mixing conditions. For example, laminar flow during mixing gives excellent results. Low shear mixing can e.g. be obtained by flowing together the process water and the amine and this mixture if desired can be fed through a static mixer, baffles or other device to achieve low shear mixing. The temperature of reaction is not critical but greater reaction rates are obtained at higher temperatures, and, therefore, it is normally preferred to have temperatures of at least 0°C. such as from about 0 to 90°C. Although a wide range of temperatures can be used, it has been discovered that temperatures of at least about 60° C. or about 70°C. give superior separations. If the process water is coming fairly directly from the process it will normally be heated to some extent approximating the temperature of polymerization, but it is within the scope of this invention to cool the process water prior to reaction with the amine. The reaction with the amine can be conducted at atmospheric, subatmospheric or superatmospheric pressure but it is normally more convenient to conduct the reaction at approximately atmospheric pressure. The ratio of amine to process water will depend upon such variables of concentration of condensation product salts in the process water, the presence of other materials which will react with the amine, the desired degree of reaction, the desired degree of removal of the condensation product salts, the number and type of amine groups. In general, polyamines having a larger number of amine groups and preferably secondary amine groups are more effective in this reaction and, therefore, can be used in lower percentages. Suitable ratios of amines to condensation product salts are such as from 0.01 to 10 moles of amine per mole of condensation product salts. Other liquids may be present such as organic liquid solvents including alcohol such as methyl alcohol, glycols such as ethylene glycol, aromatic compounds such as toluene or benzene, petroleum cuts such as kerosene or naphtha, other hydrocarbons such as vinylcyclohexene and the like. If organic compounds are added normally they will be added in an amount of less than 50 percent of the total weight of process water plus organic compound.

According to this invention the pH of the process water containing the condensation product salts and/or the pH of the amine composition will be reduced to 7.0 or less prior to mixing these components and the pH of the resultant composition will be 7.0 or less. Any suitable acid can be used to reduce the pH but the highly ionized acids are more efficient such as those having an ionization constant $K_a$ of at least $1 \times 10^{-4}$. The acid should be one that in the composition in which precipitation is to take place is more highly ionized than the sulfonic acid equivalent to the salt of the condensation product of naphthalene sulfonic acid and formaldehyde. In general, if the medium is mainly aqueous the acid should be more highly ionized than acetic acid with suitable acids being such as hydrochloric, sulfuric, nitric and the like. If organic solvents are included or added to the process water acids which are weakly acidic in water, such as acetic, can be utilized because of the presence of the organic component.

Although this invention has been particularly described for the separation of condensation product salts from neoprene process water, it can be used also for the separation of condensation product salts from other aqueous compositions wherein the water contains less than 5 percent total solids including the condensation product salts. The invention is useful for the separation of the condensation product salts from other polymerization processes. The examples of other processes are emulsion or suspension polymerization processes such as for butadiene-styrene rubber (GRS) and polyvinylchloride or polyvinylacetate.

The following examples are merely illustrative and are not intended to limit the invention. All percentages are by weight unless expressed otherwise.

EXAMPLE 1

A mercaptan-modified noeprene latex is prepared using the following recipe:

| Polymerization Charge | Conc. in Parts by Weight |
|---|---|
| Chloroprene | 100 |
| 2,6-ditertiary-butyl para-cresol | 0.1 |
| Resin-731S*[1] | 4.0 |
| Lomar PW[2] | 0.7 |
| Deionized Water | 100 |
| Sodium hydroxide (100%) | 0.6 |
| n-Dodecyl mercaptan (100%) | 0.235 |
| Initial Catalyst | |
| Sodium hydrosulfite | 0.0294 |
| Deionized Water | 0.588 |
| Pumped Catalyst | |
| .358% potassium persulfate in aqueous solution used as required to maintain the polymerization rate | |

[1] A disproportionated wood rosin, purified by distillation and sold by Hercules Powder Company.
[2] Lomar PW is the sodium salt of the condensation product of naphthalene sulfonic acid with formaldehyde manufactured by Nopco Chemical Co. and is 87% by weight actives.

The latex is acidified with acetic acid and thereafter fed to a freeze roll which rotates partly immersed in the latex. This freeze roll is cooled to a temperature of −15°C. by circulating brine. In this process the latex is frozen on the drum and is coagulated as the drum revolves. The coagulated film is stripped from the roll by a stationary knife and is placed on a continuous belt where it is thawed and washed. This process water is then treated with amines in accordance with this invention.

The process wash water is treated with Dow Amine Residue E-100 having the following analysis:

| | |
|---|---|
| Ethylenediamine (area %) | 0.3 |
| Piperazine | 0.8 |
| Diethylenetriamine | 0.8 |
| Aminoethylpiperzine | 1.0 |
| Nitrilotrisethylamine | 0.1 |
| Tetraethylenetriamine | 0.7 |
| Diaminoethyl piperazine | 0.2 |
| Piperazo ethyl ethylenediamine | 0.4 |
| Unknown | 0.4 |
| 4-Aminoethyltriethylene-tetramine Branched | 0.7 |

| -Continued | |
|---|---|
| Tetraethylenepentamine | 4.4 |
| Aminoethylpiperazinoethyl-ethylenediamine (cyclic) | 1.6 |
| Piperazinoethyldiethylene-triamine (cyclic) | 1.8 |
| Pentaethylenehexamine | 45.2 |
| Heavies (higher ethyleneamine polymers) | 41.8 |
| Amine Number mg KOH/gm | 1232 |

The process wash water contains 800 ppm of the condensation product salts (Lomar PW) based on the process wash water. The pH of the process water is gradually reduced to 4.0 by the addition of concentrated sulfuric acid. The amine is mixed with the process wash water in an amount of .5 parts of amine composition of the analysis shown per 1.0 part of condensation product salts in the process wash water by feeding the amine to the process water in an inline mixing procedure using a syringe pump to pump the amine into the acidified process wash water. The amine composition is gradually added to the process water and, thereafter, the mixture is gently mixed in a static mixer for 1 minute while the temperature is maintained at 40°C. The reaction product is allowed to settle out in a settling tank and a dilute solution of reaction product is removed from the bottom of the tank. The clear water overhead is pumped to a bio-oxidative degradation unit pond for further treatment to remove biodegradable components from the water. The slurry from the bottom of the settling tank is centrifuged and filtered in a filter press to give a high solids precipitate which is then incinerated.

To illustrate the advantages of this invention over the process where the process water and amine are first mixed and then acidified a comparative example is run. Example 2 illustrates the process where the composition is acidified after mixing and Example 3 illustrates this invention whereby at least one of the components is acidified prior to mixing with the other component and illustrates that improved settling rates and precipitates can be achieved. The experiments are conducted at 25°C.

EXAMPLE 2

A neoprene process water of the type obtained in Example 1 is utilized with the exception that the process water contains 700 ppm of Lomar PW. To each of two 2000 ml. beakers is added 1000 ml. of the process water. In Example 2 Dow E-100 amine (analysis in Example 1) is added such that the effective amine concentration is 100 ppm. The composition is gently agitated with a stirrer on which the propeller revolves at a rate of about 50 rpm. The pH of the composition is then gradually lowered to approximately 3.5 by the addition of 37 percent concentration hydrochloric acid with the stirring continued during addition. As soon as the pH of 3.5 is achieved 150 ml. of the stirred composition is transferred to a 200 ml. graduated cylinder. The composition is then allowed to separate into a clear water and a discrete precipitate at the bottom of the cylinder and the time required for 90 percent of the solution to be visibly free of precipitate is measured.

EXAMPLE 3

Example 2 is repeated with the exception that the process water is first acidified to a pH of 3.5 by the addition of 37 percent concentrated hydrochloric acid while stirring at a rate of about 50 rpm. As soon as the pH of 3.5 is achieved the amount of Dow E-100 amine added as in Example 2. Again the time required for 90 percent of the solution to be visibly free from precipitate is measured. The following results are obtained:

|  | Time to Settle Minutes | Appearance of Precipitate |
|---|---|---|
| Example 2 | 40 | Small particles appeared to contain entrained air. |
| Example 3 | 20 | Larger size particles of greater density. |

EXAMPLES 4-7

The following examples utilize the process of Example 1 with the noted exceptions. The same process water is treated in each instance.

| Ex. | Polyamine | Acid for pH | Temp. of Reaction 20 |
|---|---|---|---|
| 4 | $H_2N(CH_2)_2NH_2$ | 37% HCl | 50°C. |
| 5 | $H_2N-CH_2-CH-NH-CH_2-CH_2NH_2$ ↓ $CH_3$ | 15.6 N $HNO_3$ | 30°C. |
| 6 | $(C_3H_7)_3-N$ | 37% HCl | 40°C. |
| 7 | $C_3H_7-NH-CH_3$ | 37% HCl | 40°C. |

EXAMPLE 8

The process of Example 1 is repeated with the exception that the condensation product salt is an ammonium salt instead of the sodium salt.

EXAMPLE 9

To illustrate the removal of rosin acids and compounds by the process of this invention a process water of the type used in Example 1 is employed with the process water having approximately 290 ppm of rosin compounds (mostly rosin acids). The process water is precipitated according to the process of the invention using the amine composition of Example 1. After precipitation the water is analyzed and found to contain 35 percent less rosin compounds and the wash water is much more suitable for treatment by biooxidative degradation.

The invention claimed is:

1. The process for the separation of salts of the condensation product of naphthalene sulfonic acids and formaldehyde from polymerization process water containing said salts in amount of less than 2 weight percent and containing less than 5 percent total solids which comprises contacting said aqueous composition containing said salt as a first component with a second component which is a polyalkylene amine of the formula $H_2N[-R-NH]_xH$ wherein R is an aliphatic radical of 1 to 5 carbon atoms and $x$ is from 1 to 12 said contacting having been made after at least one of the components has been reduced to a pH of less than 5.0 by the addition of an acid to said component or components and whereby the pH of the combination of the first and second component is also less than 5.0, and separating the resulting precipitate from the aqueous composition.

2. The process of claim 1 wherein said process water is reduced to a pH of no greater than 4.0 prior to contacting with said amine.

3. The process of claim 1 wherein said amine comprises a polyalkylene amine of the formula $H_2N[-R-NH]_xH$ wherein R is aliphatic and has from 2 to 3 carbon atoms and $x$ is from 2 to 10.

4. The process of claim 1 wherein the said amine is ethylene diamine.

5. The process of claim 1 wherein the said amine is a compound of the formula $H_2N-]C_2H_4NH]_xH$ wherein $x$ is from 2 to 10 and mixtures thereof.

6. The process of claim 5 wherein $x$ is from 2 to 6 and mixtures thereof.

7. The process of claim 1 wherein the said pH is achieved by use of an acid having an ionization constant $K_a$ of at least $1 \times 10^{-4}$.

8. The process of claim 1 wherein the said amine has a basic ionization constant $K_b$ of at least $1 \times 10^{-4}$.

9. The process of claim 1 wherein the said amine has a solubility in water at 25°C. of at least 1 gram per liter.

10. The process of claim 1 wherein the said amine is a mixture of polyethyleneamines.

11. The process of claim 1 wherein the said salt is an alkali metal salt.

12. The process of claim 1 wherein the said salt is a sodium salt.

13. The process of claim 1 wherein the said salt comprises the sodium salt of the condensation of about two moles of naphthalene sulfonic acid with one mole of formaldehyde.

14. The process of claim 1 wherein the said salt is present in an amount of no greater than 5 weight percent of said process water.

15. The process of claim 1 wherein the pH is controlled by use of an acid selected from the group consisting of hydrochloric acid, sulfuric acid, nitric acid and mixtures thereof.

16. The process of claim 1 wherein the said amine has at least one secondary amine nitrogen.

* * * * *

UNITED STATES PATENT OFFICE
CERTIFICATE OF CORRECTION

PATENT NO. : 3,890,227

DATED : 06/17/75

INVENTOR(S) : Philip Merchant, Jr.

It is certified that error appears in the above-identified patent and that said Letters Patent are hereby corrected as shown below:

Column 1, Line 29 reads "noeprene" but should read --- neoprene ---

Column 4, Line 9 reads "703-730" but should read --- 705-730 ---

Column 9, Line 22 reads "Reaction 20" but should read --- Reaction --

Column 10, Line 23 reads "$H_2N$——] $C_2H_4NH]_xH$" but should read --- $H_2N$—{ $C_2H_4NH]_xH$ ---

Signed and Sealed this

*thirtieth* Day of September 1975

[SEAL]

Attest:

RUTH C. MASON
*Attesting Officer*

C. MARSHALL DANN
*Commissioner of Patents and Trademarks*